US009692806B2

United States Patent
Hochmuth

(10) Patent No.: US 9,692,806 B2
(45) Date of Patent: Jun. 27, 2017

(54) ROUTE A SERVICE

(75) Inventor: Roland M. Hochmuth, Fort Collins, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 432 days.

(21) Appl. No.: 13/994,274

(22) PCT Filed: Dec. 17, 2010

(86) PCT No.: PCT/US2010/060904
§ 371 (c)(1),
(2), (4) Date: Jun. 14, 2013

(87) PCT Pub. No.: WO2012/082133
PCT Pub. Date: Jun. 21, 2012

(65) Prior Publication Data
US 2013/0262555 A1    Oct. 3, 2013

(51) Int. Cl.
*G06F 13/00*    (2006.01)
*H04L 29/08*    (2006.01)
*G06F 9/50*    (2006.01)

(52) U.S. Cl.
CPC ............ *H04L 67/10* (2013.01); *G06F 9/5044* (2013.01)

(58) Field of Classification Search
CPC ............................ H04L 67/10; G06F 9/5044
USPC ......................................... 709/238–243, 201
See application file for complete search history.

(56) References Cited

U.S. PATENT DOCUMENTS

| 7,055,134 | B2 * | 5/2006 | Schroeder | 717/120 |
| 7,209,945 | B2 * | 4/2007 | Hicks et al. | 709/203 |
| 7,761,591 | B2 * | 7/2010 | Graham | 709/233 |
| 7,865,500 | B2 * | 1/2011 | Son et al. | 707/712 |
| 8,060,074 | B2 * | 11/2011 | Danford | H04L 41/0893 455/419 |
| 8,286,219 | B2 * | 10/2012 | Khalid et al. | 726/1 |
| 8,396,465 | B2 * | 3/2013 | Danford | H04L 41/0893 455/419 |
| 8,626,147 | B2 * | 1/2014 | Danford | H04L 41/0893 455/414.1 |

(Continued)

FOREIGN PATENT DOCUMENTS

WO    WO-2008/111049 A2    9/2008

OTHER PUBLICATIONS

International Searching Authority, International Search Report and Written Opinion, Appln No. PCT/US2010/060904, date of mailing Aug. 30, 2011, 9 p.

*Primary Examiner* — Kenneth R Coulter
(74) *Attorney, Agent, or Firm* — HP Inc. Patent Department

(57) ABSTRACT

Example implementation relate to routing a service. In one example, routing a service can employ a desktop device in communication with a portable device, the desktop device including an application compatible with the portable device, a virtual environment to run the application on the desktop device, a transceiver to communicate with the portable device, and a router to maintain a data structure that tracks local services on the desktop computer and remote services on the portable device, and invoke a service request by the application from at least one of a local framework on the first device and a remote framework to run the service on the portable device based on the data structure.

16 Claims, 5 Drawing Sheets

(56) References Cited

U.S. PATENT DOCUMENTS

| | | | |
|---|---|---|---|
| 8,811,970 B2* | 8/2014 | Danford | H04L 41/0893 455/414.1 |
| 2003/0184583 A1 | 10/2003 | Lim | |
| 2003/0208583 A1* | 11/2003 | Schroeder | 709/223 |
| 2004/0054718 A1 | 3/2004 | Hicks et al. | |
| 2005/0138037 A1* | 6/2005 | Son et al. | 707/10 |
| 2005/0246718 A1 | 11/2005 | Erlingsson et al. | |
| 2007/0050765 A1 | 3/2007 | Geisinger | |
| 2007/0143398 A1 | 6/2007 | Graham | |
| 2007/0256073 A1 | 11/2007 | Troung et al. | |
| 2008/0222238 A1 | 9/2008 | Ivanov et al. | |
| 2010/0031308 A1* | 2/2010 | Khalid | 726/1 |
| 2010/0153948 A1 | 6/2010 | Schreiber et al. | |
| 2012/0015644 A1* | 1/2012 | Danford | H04L 41/0893 455/419 |
| 2014/0087712 A1* | 3/2014 | Danford | H04L 41/0893 455/419 |

* cited by examiner

ROUTE A SERVICE

BACKGROUND

An application can be written to be executed by a specific hardware or software. For example an application for one operating system may not execute properly on another operating system. To execute an application on a system that the application is not written for may be done with a virtualizer. A virtualizer can create an environment for the application that appears to the application as the hardware or software that the application was written to execute on. The virtualizer may provide different hardware or software services that can be invoked by the application.

BRIEF DESCRIPTION OF THE DRAWINGS

Some embodiments of the invention are described with respect to the following figures.

DETAILED DESCRIPTION

An application may be written to execute on hardware and software. The application may be executed on other hardware and software that the application was not written for if a virtualizer is used to create an environment to execute the application.

The hardware and software that the application is written for may provide services to the software that the software can invoke. For example if the application wants to know the location of the device that it is executing on it can access a global positioning system (GPS) receiver for the data on the location. In another example if the application is to capture an image the application can access a camera. The services may also be software services such as accessing a database for retrieving subscriber information. Many other services may be invoked by an application.

If an application is executed in a virtual environment some services may not be created virtually for example if the physical hardware does not include a GPS receiver, a camera or the software does not include a database then providing the service in a virtual environment would not provide the application with the correct data. If the device that was executing the virtual environment and the application was able to send requests for a service it did not provide to another device that could provide the services the application could access the correct data. For example if a desktop computer was executing an application in a virtualizer that was written to be executed by a portable device such as a phone, tablet or other device and a service was not available the desktop routes the service to the portable device. The portable device can send the data back to the application on the desktop computer.

In one embodiment, a first device includes an application compatible with a second device. A virtual environment can run the application on the first device. A transceiver can communicate with the second device. A router can invoke a service requested by the application by at least one of a local framework on the first device and a remote framework to run the service on the second device.

In one embodiment, a method of routing a service request can include executing an application within a virtual environment on a first device. The service can be requested by the application and then it can be determined where to invoke the service. The service can be routed to a local framework on the first device if it is determined to invoke the service on the local framework or to a remoting framework on a second device if it is determined to invoke the service on the second device.

Figure 1:
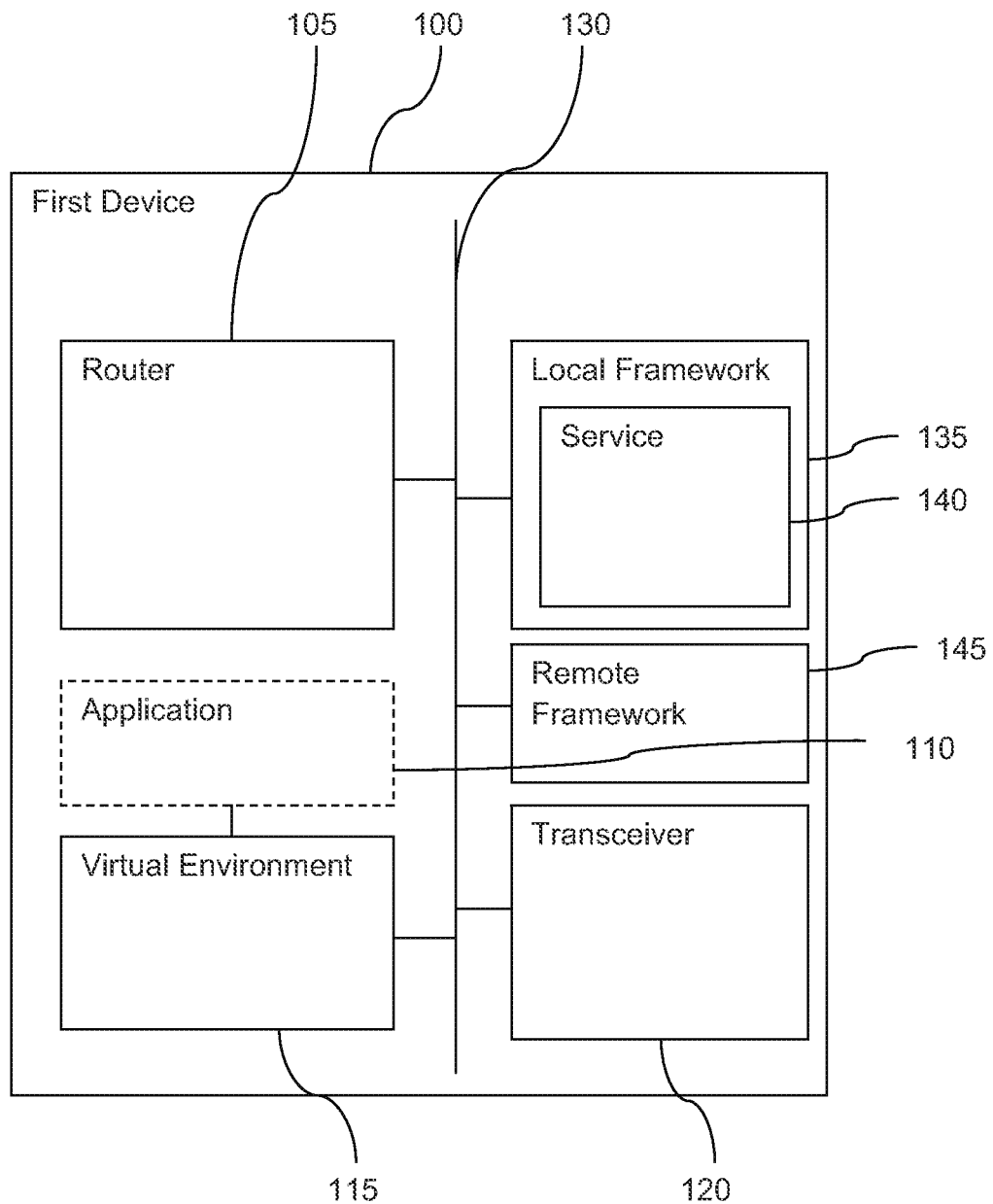
FIG. 1 is a block diagram of a device for routing a service according to an example embodiment of the invention.

With reference to the figures, FIG. 1 is a block diagram of a device for routing a service request according to an example embodiment of the invention. The first device 100 can include an application 110. The first device 100 can operate with a first hardware and a first operating system to execute the application 110. The application 110 may be compatible with a second device. For example the application 110 may be written to natively execute on the hardware of the second device and on the operating system of the second device.

If the application 110 is written to be compatible with the second device then the application 110 may not be compatible with the first device 100 without a virtual environment 115. The first device 100 can include a virtual environment 115 to execute the application 110 on the first device 100. The virtual environment 115 may be a java script virtual machine to run at least one of a java script application, a hypertext markup language (HTML) application, a Cascading Style Sheets (CSS) applications, applications written in other languages or application written in a combination of languages.

The first device may be connected to a second device through a transceiver 120. The transceiver 120 can communicate with a second device. The transceiver 120 can receive data from the second device, for example the application 110 may be sent from the second device or may be stored on the first device 100.

The application 110 may ask to invoke a service 140. A service 140 is a program or routine that that provides support for other programs such as application 110. The service may be hardware that provides data to the application 110. The service 140 may for example allow an application to receive data from a global position sensor (GPS) receiver or from a camera.

A router 105 can invoke a service request by the application 110 by at least one of a local framework 135 on the first device 100 and a remote framework 145 to run the service 140 on the second device.

Figure 2:
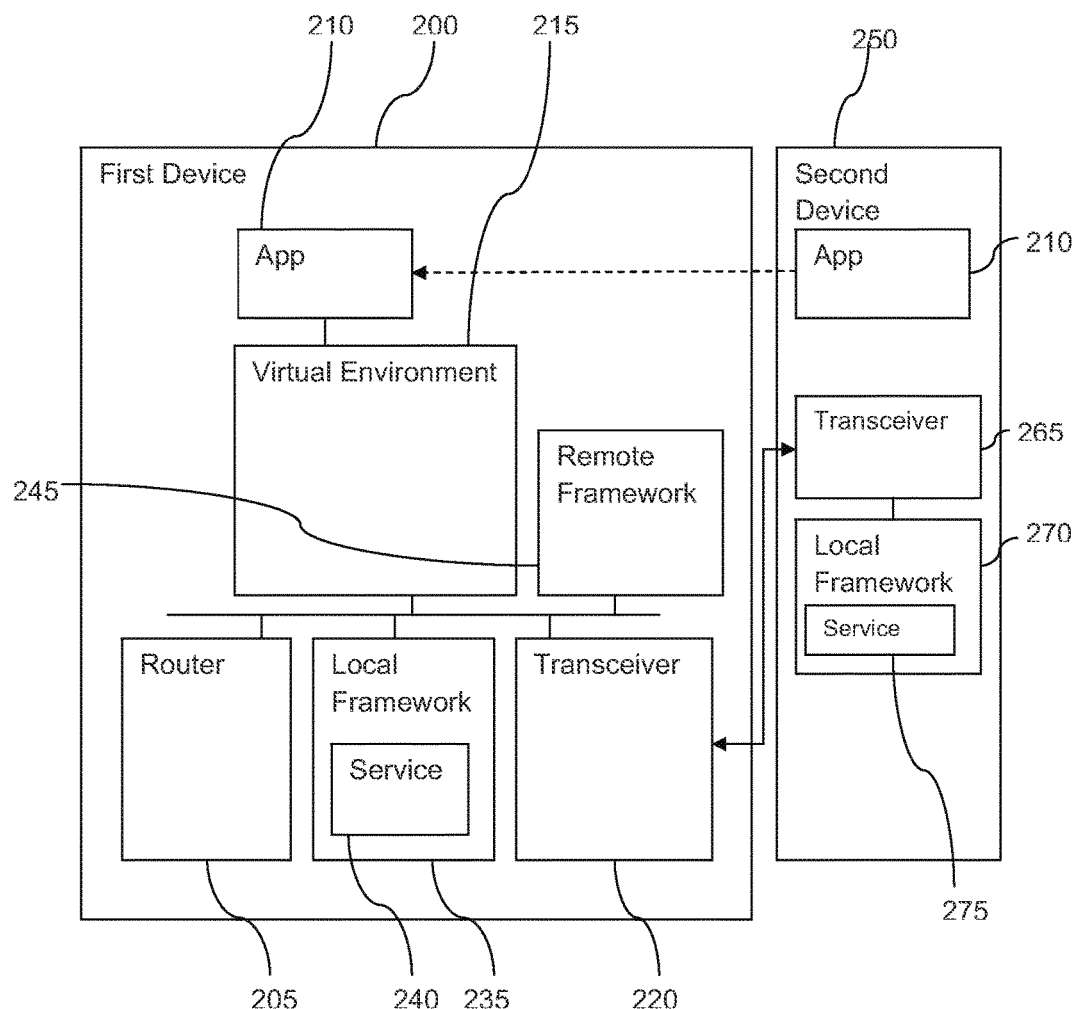
FIG. 2 is a block diagram of a system for routing a service according to an example embodiment of the invention.

FIG. 2 is a block diagram of a system for routing services according to an example embodiment of the invention. The first device 200 can include an application 210. The first device 200 can operate with a first hardware and a first operating system to execute the application 210. The application 210 may be compatible with a second device 250. For example the application 210 may be written to natively execute on the hardware of the second device 250 and on the operating system of the second device 250.

If the application 210 is written to be compatible with the second device 250 then the application 210 may not be compatible with the first device 200 without a virtual environment 215. The first device 200 can include a virtual environment 215 to execute the application 210 on the first device 200.

A router 205 can invoke a service request by the application 210 by at least one of a local framework 235 on the first device 200 and a remote framework 145 to run the service 240 on the second device 250.

An application running on the first device 200 may invoke a service, such as a Location Service. An Operating system may provide services to the application.

Code or instructions may be executed to request the service. In one example instructions called Mojo.Service.Request may be used by an application 201 to send requests to a service 240 running on the first device 200. The first parameter in the request, Mojo.Service.Request, specifies the uniform resource locator (url) of the service, which is a friendly-name, usually user readable, name of the service. An example of the friendly-name is, 'palm://com.palm.location'. Another parameter specifies the request to invoke for example "getCurrentPosition", the parameters if any, and what to invoke if the invocation is successful, "onSuccess", or fails, "on Failure".

The invocation of Mojo.Service.Request is first internally sent to a router 205. Mojo.Service.Request establishes a connection with the router 205 and sends the request. The router 205 may apply security access roles to allow or deny further processing of the request. The router 205 can determine whether to handle the request locally or remotely. The router can then look up and return the inter process communication (IPC) endpoint of the service 240 to use to the application 210. Note, IPC mechanisms include sockets, shared memory, named pipes, or other.

In the case that the request is to be handled locally, the router returns the IPC endpoint, such as a socket address, to the application 210. The IPC endpoint will be used to directly connect to the service 240. Mojo.Service.Request next establishes a connection to the service 240 using the IPC endpoint. The request, which includes the original friendly-name of the service, method and parameters can be sent as a message directly to the service 240 using the IPC mechanism. Data from the service 240 invocation are sent back over the IPC connection back to the application 210.

The application 210 first queries the router 205 for the endpoint of the service 240. The router determines whether the service request should be handled locally or remotely. If the request should be handled locally, the router returns the endpoint of the service 240 to the application 210. The application 210 can then use the endpoint to establish a connection to the service 240. The application 210 then sends the request to the service 240 and the service 240 returns the data.

In the case that the request is to be handled remotely, the router 205 returns the endpoint of a IPC endpoint of the Remote Framework 245. This may be the IPC mechanism that can be used to invoke a local service 240, but with a different endpoint or the IPC mechanism may be different than that used with the service 240. The Remote Framework 245 may appear as a local service that to send invocations remotely to a second device 250. The processing of the invocation by Mojo.Service.Request can establish a connection to the Remote Framework 245 using the IPC endpoint returned by the router. The service invocation, in the form of a message which includes the friendly-name, method, and parameters, is sent to the Remote Framework 245 using the IPC mechanism. The Remote Framework 245 on the first device then can use the transceiver 220 to forward the message to the transceiver 265 on the second device 250. The transceiver 265 running on the second device 250 can receive the message. The transceiver 265 or another component can look up the IPC endpoint of the service 275 on the second device 250. For example, the transceiver 265 uses the url of the message to determine the IPC endpoint of the service 275 on the second device 250. A map can be used that has an endpoint for each service name listed or other data structure. The transceiver 265 on the second device 250 can then connect and send the message to the service 275 on the device using that IPC endpoint.

Data from the service 275 running on the second device 250 can be sent back over the IPC connection on the second device 250, such as a socket, to the transceiver 265 on the second device 250. The transceiver 265 on the second device 250 can then forward the message to the transceiver 220 on the first device 200, which then sends them to the Remote Framework 245. The Remote Framework 245 can use the IPC connection to establish the application 210 and Remote Framework 245 to send the data back to the application 210.

The application first queries the router 205 for the endpoint of the service. The router determines whether the service request should be handled locally or remotely. If the request should be handled remotely, the router 205 can return the endpoint of the Remote Framework 245 to the application 210. The application 210 can use the endpoint of the Remote Framework 245 to establish a connection to the Remote Framework 245. The application 210 can send the request to the Remote Framework 245. The Remote Framework 245 can use the transceiver 220 to send the request to the second device 250. The transceiver 265 running on the second device 250 receives the message. The transceiver 265 may determine the endpoint of the service 275 on the second device to send the request to. The transceiver 265 on the second device 250 can establish a connection with the service 275 on the second device 250 and send the message. The response from the service 275 on the second device 250 is sent back to the application 210 on the first device 200.

The message may be re-formatted or encapsulate at any component. For example, the Remote Framework 245 may format the message in one format. The transceiver may re-format the message or encapsulate the message in a new message.

Services may be registered using several methods. For example, local services on the first device may register with the router on start-up. Additionally, after connectivity is established between the second device and first device, the transceiver 265 running on the second device 250 can send messages to the first device which register services on the second device with the router 205 running on the first device 265. The router 205 may maintain a data structure that keeps track of all of the available services, and whether they are local or remote.

TABLE 1

| ServiceName | Endpoint | Device |
| --- | --- | --- |
| palm://com.palm.location | fd1 | local |
| palm://com.palm.location | fd2 | second-device |

The endpoints, fd1 and fd2, correspond to file descriptors for the local location service and Remote Framework service. The type specifies whether the service is local, as in on the first device, or remote, as in on the second device. Using this information the router can make decisions on whether to send the invocation to the local or remote service.

If the router is running on a PC a service may not be available for example a Global positioning system (GPS) service. If the second device 250 includes a GPS service, such as a phone then the PC may send the request to the second device 250. However, in the case that the service is available on both the first device 200 and second device 250, then where to send the service request can be defined as a preference. To handle this a preference can be specified and used by the router. For example:

TABLE 2

| ServiceName | Devices |
|---|---|
| palm://com.palm.location | local, second-device |
| palm://com.palm.database | second-device, local |

Table 2 is an example of preferences for different services and indicates to use the local service 240 if available and the Remote Framework 245 to forward to the second-device if the local service is not available 250. Additionally, table 2 indicates to use the Remote Framework 245 to forward a database service request to the second device 250 if available and if not available to use the local data base service.

The first device 200 may include a notification service to output an error indication. The notification may output an error if for example the local framework 235 was invoked and was not able to provide the service 240 or the remote framework 245 was invoked and a second device 250 was not connected to the first device 200.

The second device 250 can include local framework 270. The local framework 270 can include service 275. If the application 210 requests a service the router 205 can determine whether to invoke the service with the local framework 235 or the remote framework 245. The remote framework will invoke the service 270 in the local framework on the second device through transceiver 220 and transceiver 265.

The router 205 can be configured by a setting. The setting can tell the router where to invoke the service. For example the setting may configure the router to invoke a service on the first device if available and invoke a service on the second device if the service is not available on the first device. In another example the setting may configure the router to invoke the service on the second device 250 if the application 210 was transferred from the second device to be executed on the virtual environment 215 of the first device 200.

In one embodiment a second application may be incompatible with the second device and written to execute on the first device without the virtual environment. The router may route the service request to the second application to be invoked. For example if the application requests a web browser the router may invoke the service by executing a web browser that is compatible with the first device and incompatible with the hardware and operating system of the second device.

Figure 3:
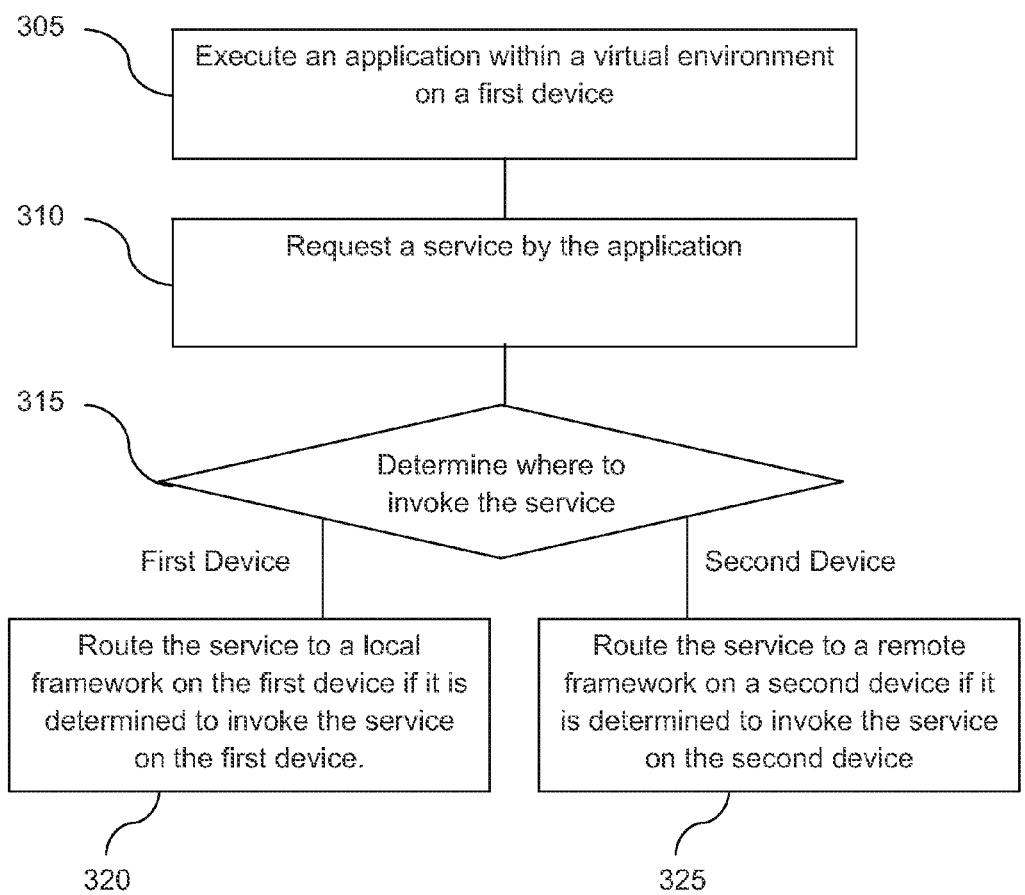
FIG. 3 is a flow diagram of a method of routing a service according to an example embodiment of the invention.

FIG. 3 is a flow diagram of a method of routing a service according to an example embodiment of the invention. The method of routing a service request can include executing an application within a virtual environment on a first device at 305. The application executing within the virtual environment can request a service at 310.

At 315 it can be determined where to invoke the service. The determination of where to invoke the service can be by a router. If it is determined to invoke the service on the first device then the service can be routed to a local framework on the first device at 320. If it is determined to invoke the service on the second device the service can be routed to a remote framework that sends the request to the second device at 325.

Figure 4:
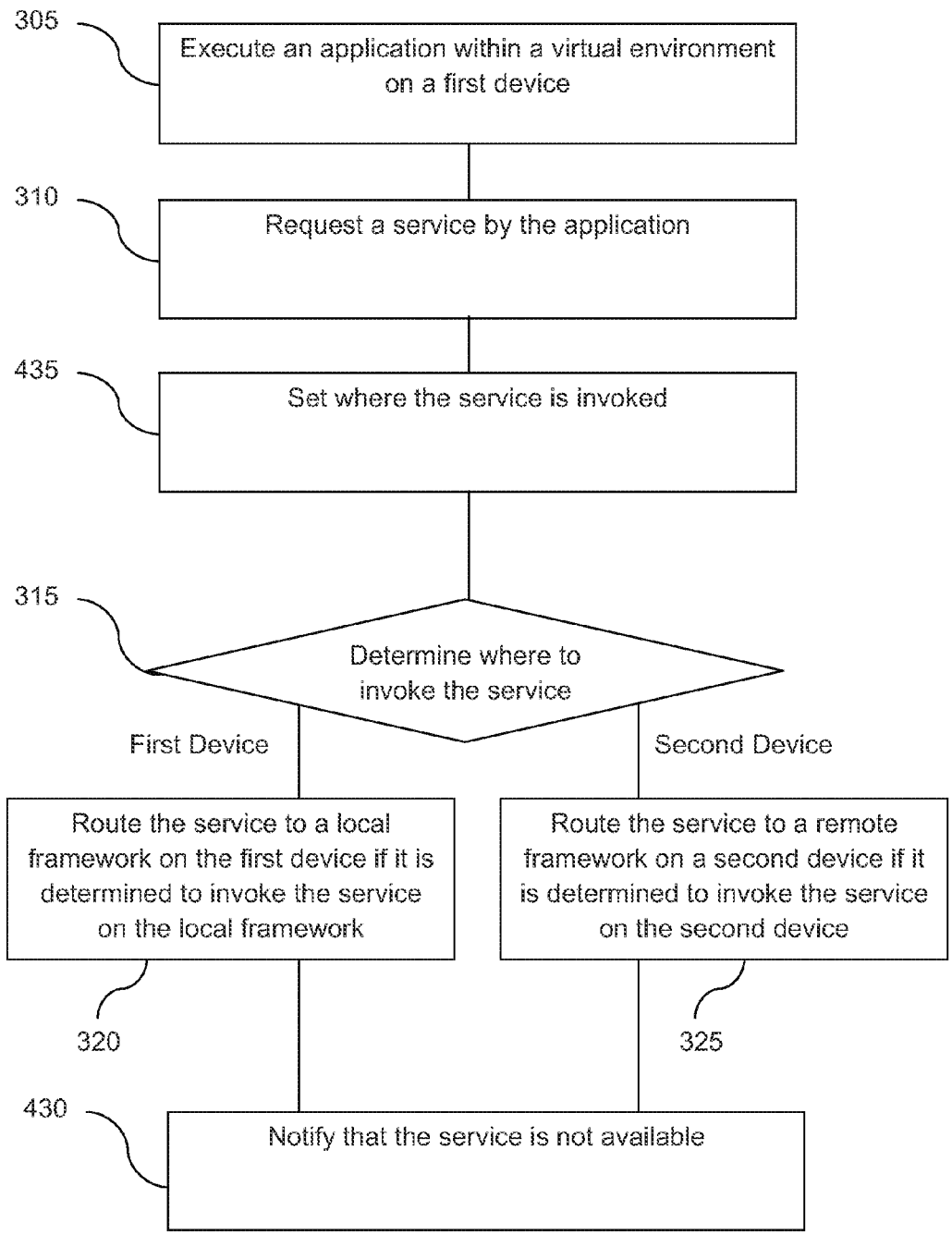
FIG. 4 is a flow diagram of a method of routing a service according to an example embodiment of the invention.

FIG. 4 is a flow diagram of a method of routing a service according to an example embodiment of the invention. The method of routing a service request can include executing an application within a virtual environment on a first device at 305. The application executing within the virtual environment can request a service at 310.

At 315 it can be determined where to invoke the service. The determination of where to invoke the service can be by a router. If it is determined to invoke the service on the first device then the service can be routed to a local framework on the first device at 320. If it is determined to invoke the service on the second device the service can be routed to a remote framework that sends the request to the second device at 325.

To determine where to route the service request the router may determine where the service is available for example on the first device or on the second device. If for example it is determined that the service is available on the first device then the service may be invoked on the first device with the local framework. If for example the service is not available on the first device the service may be invoked by the remote framework by sending the service request to the second device.

The router or another component may be notified that the service is not available at 430 by providing an error message. An error indication may also be provided to a user that the service is not available. The error indication to the user may allow the user to select a new location for the service through a user interface. For example if the error indicates that the service is not available on the first device but is available on the second device that the user can cause the service request to be invoked on the second device. The error may also indicate that the second device should be connected to the first device to allow the service to be invoked on the second device once the first and the second device are connected.

A setting can be made to indicate where the service is invoked. The setting may be multiple rules. For example the setting may include a rule that if the application is sent to the first device from a second device that the service request is routed to the second device. In another example the setting may include that the service is invoked on the local framework of the first device if the service is available on the first device otherwise the service request is routed to the second device.

Figure 5:
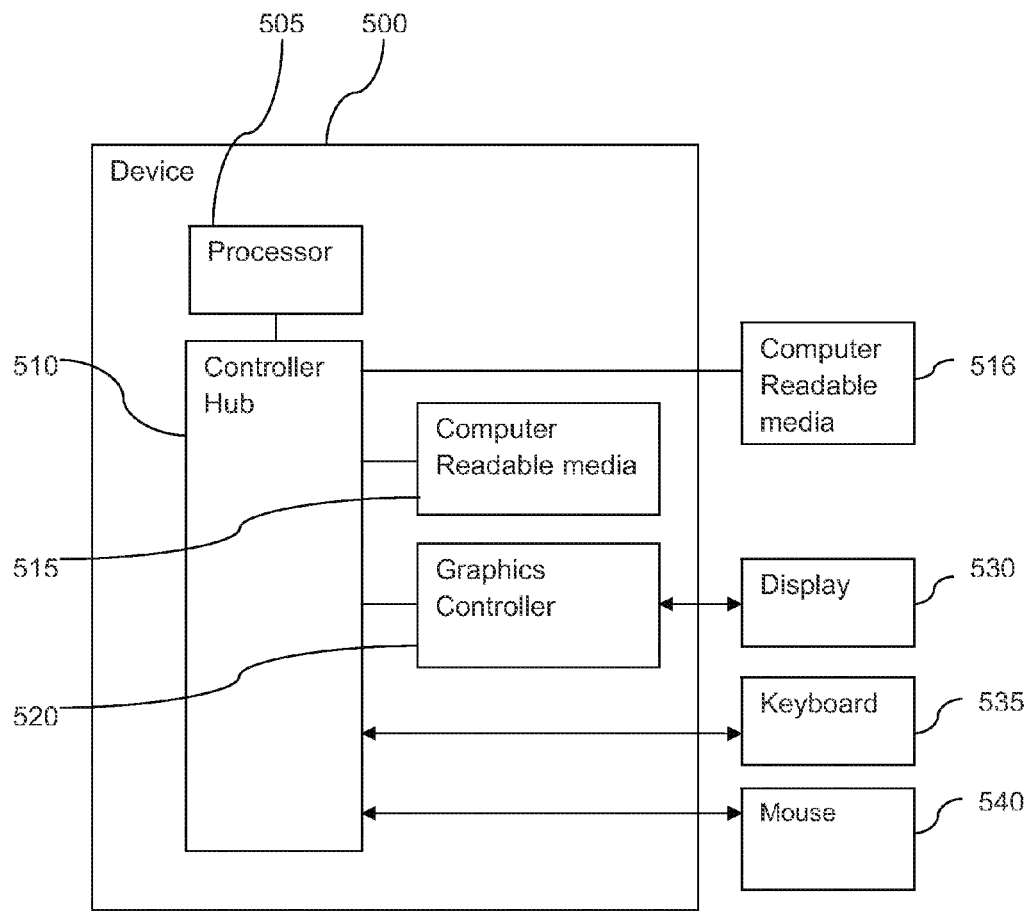
FIG. 5 is a device according to an example embodiment of the invention.

FIG. 5 is a device according to an example embodiment of the invention. The device 500 can include hardware such as a processor 505. The processor can be connected to a controller hub 510. The controller hub 510 and the processor 505 may be integrated as one component. The controller hub 510 can be connected to other controllers, peripherals or components. For example, a graphics controller 520 can be connected to the controller hub 510. The graphics controller 520 can provide data to the display 530 to be displayed.

The controller hub may be connected to other peripherals such as a keyboard or mouse. The keyboard 535 or mouse 540 may be connected to an input output controller or a keyboard controller that is part of the controller hub 510.

The controller hub may be connected to computer readable media 515 or 516. The computer readable media 515 or 516 can include code that if executed can cause the processor 505 to execute an application within a virtual environment on a first device. The processor can invoke a service requested by the application and determine where to invoke the service. The processor can route the service to a local framework on the first device if it is determined to invoke the service on the local framework. The processor can also route the service to a remote framework on a second device if it is determined to invoke the service on the second device.

The techniques described above may be embodied in a computer-readable medium for configuring a computing system to execute the method. The computer readable media may include, for example and without limitation, any number of the following: magnetic storage media including disk and tape storage media; optical storage media such as compact disk media (e.g., CD-ROM, CD-R, etc.) and digital video disk storage media; holographic memory; nonvolatile memory storage media including semiconductor-based memory units such as FLASH memory, EEPROM, EPROM, ROM; ferromagnetic digital memories; volatile storage media including registers, buffers or caches, main memory, RAM, etc.; and the Internet; just to name a few. Other new and various types of computer-readable media may be used to store and/or transmit the software modules discussed herein. Computing systems may be found in many forms including but not limited to mainframes, minicomputers, servers, workstations, personal computers, notepads, personal digital assistants, various wireless devices and embedded systems, just to name a few.

In the foregoing description, numerous details are set forth to provide an understanding of the present invention. However, it will be understood by those skilled in the art that the present invention may be practiced without these details. While the invention has been disclosed with respect to a limited number of embodiments, those skilled in the art will appreciate numerous modifications and variations there from. It is intended that the appended claims cover such modifications and variations as fall within the true spirit and scope of the invention.

What is claimed is:

1. A desktop device in communication with a portable device, the desktop device comprising:
   an application compatible with the portable device, wherein the application is written to natively execute on hardware and an operating system of the portable device;
   a virtual environment to run the application written to natively execute on the hardware and the operating system of the portable device on the desktop device;
   a transceiver to communicate with the portable device; and
   a router to:
      maintain a data structure that tracks local services on the desktop device and remote services on the portable device; and
      invoke a service request by the application from at least one of a local framework on the first device and a remote framework to run a service on the portable device based on the data structure, wherein when the requested service is available on the desktop device and the portable device, an ordered preference is used to determine whether to send the service request to the desktop device or the portable device.

2. The device of claim 1, wherein the application is transferred from the portable device to the desktop device when the application requests to invoke a service.

3. The device of claim 1, further comprising a notification service to output an error indication if the local framework was invoked and was not able to provide the service.

4. The device of claim 1, further comprising a setting to configure the router to determine whether to invoke the requested service on the first device or the portable device, wherein the determination is based on the data structure and the ordered preference.

5. The device of claim 1, further comprising logic for the portable device to run the application.

6. The device of claim 1, further comprising a second application incompatible with the portable device and executing on the desktop device, wherein the router invokes the service using the second application.

7. The device of claim 1, wherein the virtual environment is a java script virtual machine to run at least one of a java script application, a hypertext markup language application, and a CSS application.

8. The device of claim 1, wherein the service is hardware that provides data to the application.

9. The desktop device of claim 1, wherein the portable device comprises a phone or a tablet.

10. A method of routing a service request comprising:
    executing an application within a virtual environment on a desktop device, wherein the application requests a service, and wherein the application is written to natively execute on hardware and an operating system of a portable device;
    determining where to invoke the service based on a data structure maintained by a router of the desktop device that tracks local services on the desktop computer and remote services on the portable device, wherein an ordered preference stored on the router is used to determine whether to invoke the service on the desktop device or the portable device when the service is available on the desktop device and the portable device;
    routing the service request to a local framework on the desktop device if it is determined to invoke the service on the local framework; and
    routing the service request to a remote framework on the portable device if it is determined to invoke the service on the portable device.

11. The method of claim 10, wherein to invoke the service on the local framework is determined if the service is available on the desktop device.

12. The method of claim 10, further comprising defining where the service is invoked.

13. The method of claim 10, further comprising notifying the router that the service is not available.

14. A non-transitory computer readable medium comprising code that when executed causes a processor on a desktop device to:
    execute an application within a virtual environment on the desktop device, wherein the application is written to natively execute on hardware and an operating system of a portable device;
    invoke a service requested by the application;
    determine where to invoke the service based on a data structure maintained by a router of the desktop device that tracks local services on the desktop computer and remote services on the portable device, wherein an ordered preference stored on the router is used to determine whether to invoke the service on the desktop device or the portable device when the service is available on the desktop device and the portable device;
    route the service to a local framework on the desktop device if it is determined to invoke the service on the local framework; and
    route the service to a remote framework on the portable device if it is determined to invoke the service on the portable device.

15. The non-transitory computer readable medium of claim 14 further comprising code that if executed causes a processor to:
    set where the service is invoked.

16. The non-transitory computer readable medium of claim 14 further comprising code that if executed causes a processor to:

notify the router that the service is not available.

\* \* \* \* \*